United States Patent [19]

Cremona

[11] Patent Number: 4,809,574

[45] Date of Patent: Mar. 7, 1989

[54] SYSTEM FOR SELECTING, ON THE BASIS OF THEIR SIZE, WOOD VENEERS

[75] Inventor: Angelo Cremona, Monza, Italy

[73] Assignee: Angelo Cremona & Figlio S.p.A., Milan, Italy

[21] Appl. No.: 198,649

[22] Filed: May 24, 1988

Related U.S. Application Data

[63] Continuation-in-part of Ser. No. 911,108, Sep. 24, 1986, abandoned.

[30] Foreign Application Priority Data

Sep. 25, 1985 [IT] Italy ............................ 22268 A/85

[51] Int. Cl.[4] ...................... B27L 5/08; B65G 15/04; B65G 47/91

[52] U.S. Cl. ....................................... 83/80; 83/99; 83/100; 83/102; 83/152; 83/155.1; 83/371; 209/518; 209/586; 209/644; 209/905

[58] Field of Search ........................... 83/80, 98-100, 83/102, 362, 371, 152, 155, 155.1; 144/209 R; 209/586, 518, 644, 905, 932

[56] References Cited

U.S. PATENT DOCUMENTS

| | | | |
|---|---|---|---|
| 2,120,313 | 6/1938 | Smitmans | 83/80 |
| 3,199,673 | 8/1965 | Flint | 209/586 |
| 3,583,562 | 6/1971 | Yock | 209/586 |
| 3,592,329 | 7/1971 | Fleischauer | 209/905 |
| 3,918,586 | 11/1975 | Tyler et al. | 209/586 |
| 4,211,132 | 7/1980 | Nichols, III et al. | 83/80 |
| 4,397,204 | 8/1983 | Colombo | 83/289 |
| 4,560,060 | 12/1985 | Lenhart | 209/905 |

FOREIGN PATENT DOCUMENTS 3632779 4/1987 Fed. Rep. of Germany .

*Primary Examiner*—Donald R. Schran
*Assistant Examiner*—Hien H. Phan
*Attorney, Agent, or Firm*—Toren, McGeady & Associates

[57] ABSTRACT

A system for selecting wood veneers on the basis of their size comprises in combination: a cutter, at least a selector apparatus downstream of the cutter composed of a vacuum conveyor, expellers cooperating with the conveyor to separate the veneer from it, sensors for reading the length of the veneer which are disposed upstream of the cutter and which control the coming into operation of the expellers, and a conveyor for taking the veneers to a stacker downstream of the selector apparatus. The expellers consist of a plurality of compressed air nozzles above the feed path of the veneer which are adapted to direct in a controlled manner jets of air against the veneer so as to detach it abruptly from the vacuum conveyor.

7 Claims, 3 Drawing Sheets

SYSTEM FOR SELECTING, ON THE BASIS OF THEIR SIZE, WOOD VENEERS

This is a continuation-in-part of application Ser. No. 06/911,108, filed Sept. 24, 1986 now abandoned.

The present invention relates to an improved system for selecting, on the basis of their size, wood veneers coming from a cutter.

As persons with ordinary skill in the art know, in a plant for the continuous production of wood veneers the veneer derived from timber is fed to a cutter which is required to cut it to measure, with elimination of the defects always present on wood.

However, precisely because of the casual presence of such defects, the final result of the cutting of the veneers is pieces of different size which need to be selected, plus defective pieces to be discarded.

The veneer pieces are mostly selected by hand, and thus selection efficiency depends on the skill, training and personal judgement of the operator; in addition a manual selection conflicts with the aim of greater output.

Automatic apparatus comprising conveyors with aspirator devices have hitherto been proposed in an attempt to overcome the problems arising from manual selection.

One apparatus of this type is for example described in the Canadian Pat. No. 1018105 and comprises a vacuum selector-conveyor disposed over a free interspace between a first belt conveyor which receives the pieces cut by the cutter and a second belt conveyor which sends them to a stacker.

The vacuum selection device is divided into two successive sections disposed angularly; the first of these comes into operation selectively only, when controlled to do so by sensors provided upstream of the cutter which measure the length of the cut piece. The pieces meeting measurement requirements are aspirated and sent—through the intermediary of the second aspirating section which is constantly in operation—to the second conveyor, while the pieces to be discarded are allowed to fall by gravity when they reach the end of the first conveyor, as a result of non-actuation of the first aspirating section.

An apparatus of such type featuring two aspirating sections with differentiated operation in which the first section for removing the pieces from the conveyor downstream of the cutter comes into operation only when controlled to do so, while the second section for sending the take-off pieces to the second conveyor which forwards them for stacking is permanently in operation, also presents problems.

The chief of these is that the vacuum existing in the second aspirating section (permanently in operation) cannot fall below certain values if it is to ensure the correct conveyance of the correctly dimensioned pieces, the size and weight of which are relatively great.

But the permanent presence of such a vacuum in the second section makes it impossible to discard small-size pieces even if the vacuum in the first section is cut-out.

For, as soon as the small pieces coming at a considerably high speed from the cutter arrive with their leading edge beyond the first non-operative section, instead of falling by gravity when they reach the end of the first conveyor, to be discarded, are taken up by the second aspirating section and conveyed to the stacker; this fact causes problems which will be self-evident.

On the other hand, lowering the feed rate of the pieces to allow the free-fall of the small pieces to be discarded conflicts with the requirements of greater output.

In addition, the need to have an angular disposition between the first alternating vacuum section and the second continuous vacuum section makes the structure of the conveyor of the selection device complicated and therefore costly.

The object of the present invention is to obviate the aforementioned problems existing in the known art by embodying a system for selecting wood veneers on the basis of their size, comprising in combination: a cutter, at least a selector device downstream of the cutter consisting of a vacuum conveyor, expeller means cooperating with the conveyor to separate the veneers from it, sensors for reading the length of the veneer, disposed upstream of the cutter and controlling the actuation of the expeller means, and a conveyor for conveying the veneers to a stacker downstream of the selector device, wherein the expeller means comprise a plurality of compressed-air nozzles disposed above the veneer feed path and adapted to the controlled direction of air jets against the veneers so as to detach them abruptly from the vacuum conveyor. In known U.S. Pat. No. 4,397,209 a sensor and electronics apparatus is disclosed for carrying out the detection and cutting of veneer imperfections. The sensor checks the veneer moving toward the cutter for imperfections and then via the electronic apparatus and a cutter cuts the veneer to remove the imperfections.

The structural and functional characteristics of the invention, and its advantages over the known art, will become more apparent from an examination of the following illustrative description thereof, with reference to the appended drawings which show an apparatus realized according to an example of practical embodiment of the invention.

Figure 1:
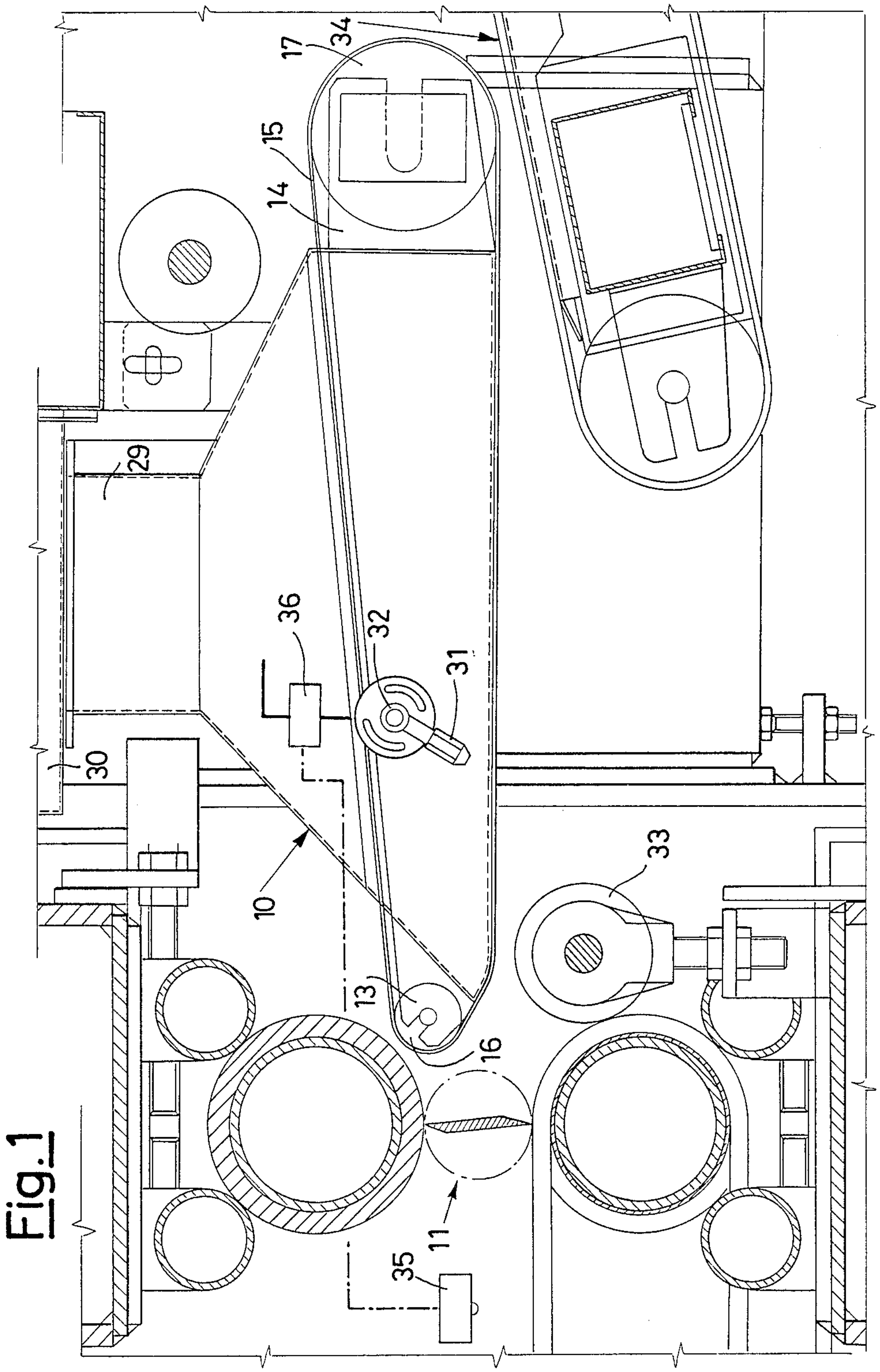
FIG. 1 is a sectional view partially illustrating a system embodied according to the invention.

With reference firstly to FIG. 1 of the drawings, the system according to the invention comprises at least a selector device 10 disposed immediately downstream of the rotary cutter 11.

The rotary cutter is not here described in detail, in that it can be of any known type, for example that forming subject matter of the co-pending patent application No. 23219 B/85, filed on Sept. 25, 1985, in the name of the Applicant of the present patent application.

Figure 4:
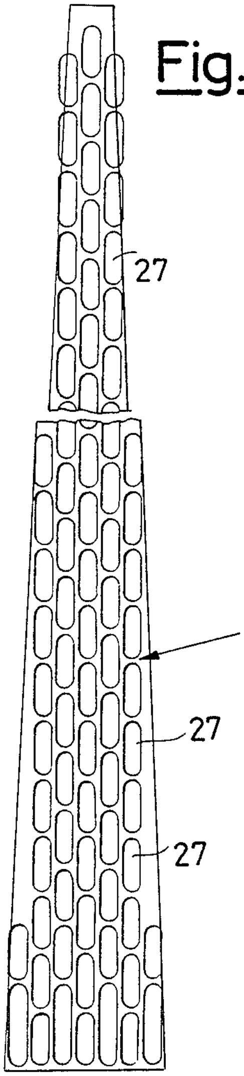
FIG. 4 is a particular illustrating the shape and disposition of the aspirating holes of the apparatus in FIG. 2.
Figure 2:
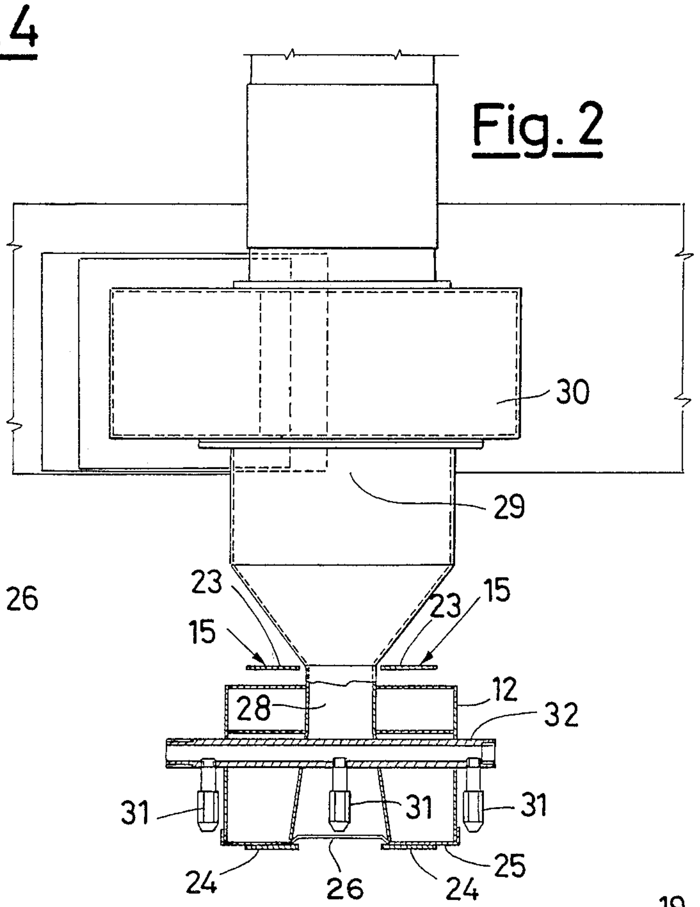
FIG. 2 is a vertical cross-sectional partial plan view illustrating an aspirator apparatus forming part of the system.
Figure 3:
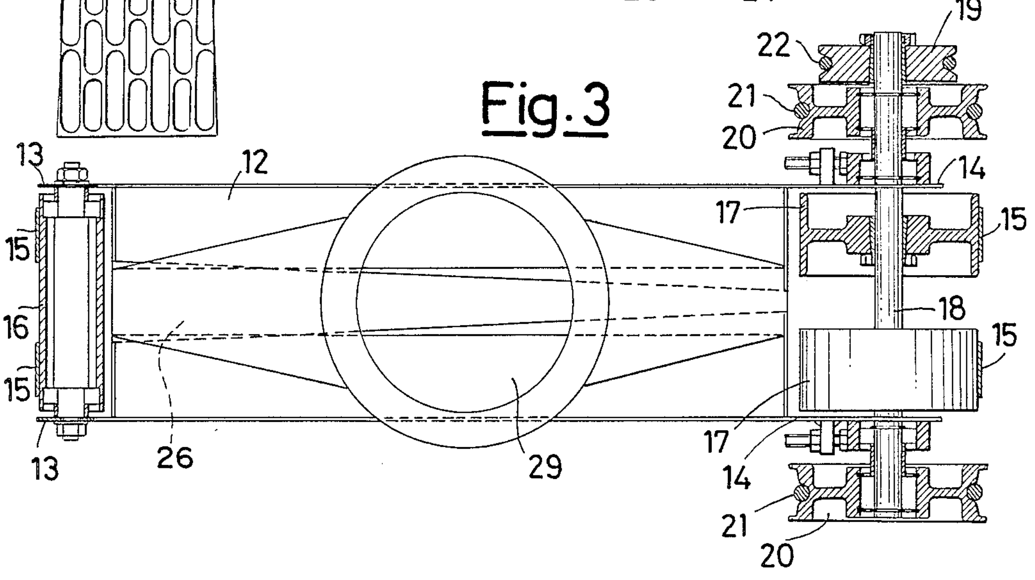
FIG. 3 is a partially sectioned plan view illustrating the same apparatus as is shown in FIG. 2.

With reference to FIGS. 2–4 of the drawings, the selector apparatus 10 consists structurally of a box 12, which extends longitudinally (FIGS. 2 and 3), at the opposite ends of which there are formed forks 13, 14 which respectively support a drive and control means for a continuous vacuum conveyor encircling the box 12.

More specifically, the said continuous conveyor comprises a pair of parallel belts 15 which at one end wind onto a freely rotating wheel 16, of smaller diameter, supported by the fork 13, and at the opposite end onto a pair of driven rollers 17, of greater diameter, supported by the fork 14. The rollers 17 are solid with a shaft 18 whose ends protrude from the fork 14 and carry solidly a control pulley 19 and a pair of freely rotating pulleys 20 for pressure belts 21 the purpose of which will become evident hereinafter. Through the intermediary of a belt transmission 22 the pulley 19 is connected to a power unit (not shown), for example to the same power unit that actuates the rotary cutter.

As FIG. 2 of the drawings clearly shows, the belts 15 of the conveyor comprise slack upper deployments or runs 23 and taut lower deployments or runs 24, the latter sliding against the back or lower wall 25 of the box 12. Between the taut deployments or runs 24, the back or lower wall 25 of the box 12 comprises an elongated tapered grille 26 (FIG. 4) with fretted cross section and featuring a series of aspiration holes 27 which are staggered one with respect to the other. The grille 26 closes on its lower side an aspiration manifold 28 connected to the aspiration side 29 of an overlying fan 30.

Immediately downstream of the conveyor admission end, the box 12 also supports a plurality of compressed-air expeller nozzles 31 which extend radially from a manifold 32 of air under pressure.

In the example shown, the nozzles 31 are three in number, one positioned centrally and two laterally.

With the above described selector apparatus 10 (FIGS. 1 and 5) there also cooperate a series of deviation rollers 33 disposed immediately to the delivery end of the selector 10, and a conveyor 34 arranged near the exit of the same selector 10.

The manner in which the system according to the invention operates is evident from what is specified above with reference to the drawings and is briefly as described below.

The selector 10 being permanently under vacuum, the veneer (not shown) coming from the cutter 11 and deviated slightly upwards by the rollers 33 is aspirated against the taut lower deployments 24 of the belts 15 which take it off from the said cutter. The take-off of the veneer by the belts 15 is facilitated by the higher vacuum existing at the mouth of the selector device where the greater cross section of the grille 26, with a greater number of aspirating holes, is positioned.

If the veneer meets dimensional requirements, the dimensions being read by a sensor 35 upstream of the cutter 11, the nozzles 31 do not come into operation and the belts 14 send the veneer to the conveyor 34, which forwards it for example to a stacking station.

If, however, the sensor 35 reads that the dimensions of the veneer are such as to require that it be discarded or not selected, the said sensor operates a solenoid valve 36 which admits compressed air into the manifold 32 with the result that the expeller nozzles 31 comes into operation and, by directing powerful jets of compressed air against the veneer, causes it to detach positively from the belts 24 and thus to fall by gravity.

Figure 5:
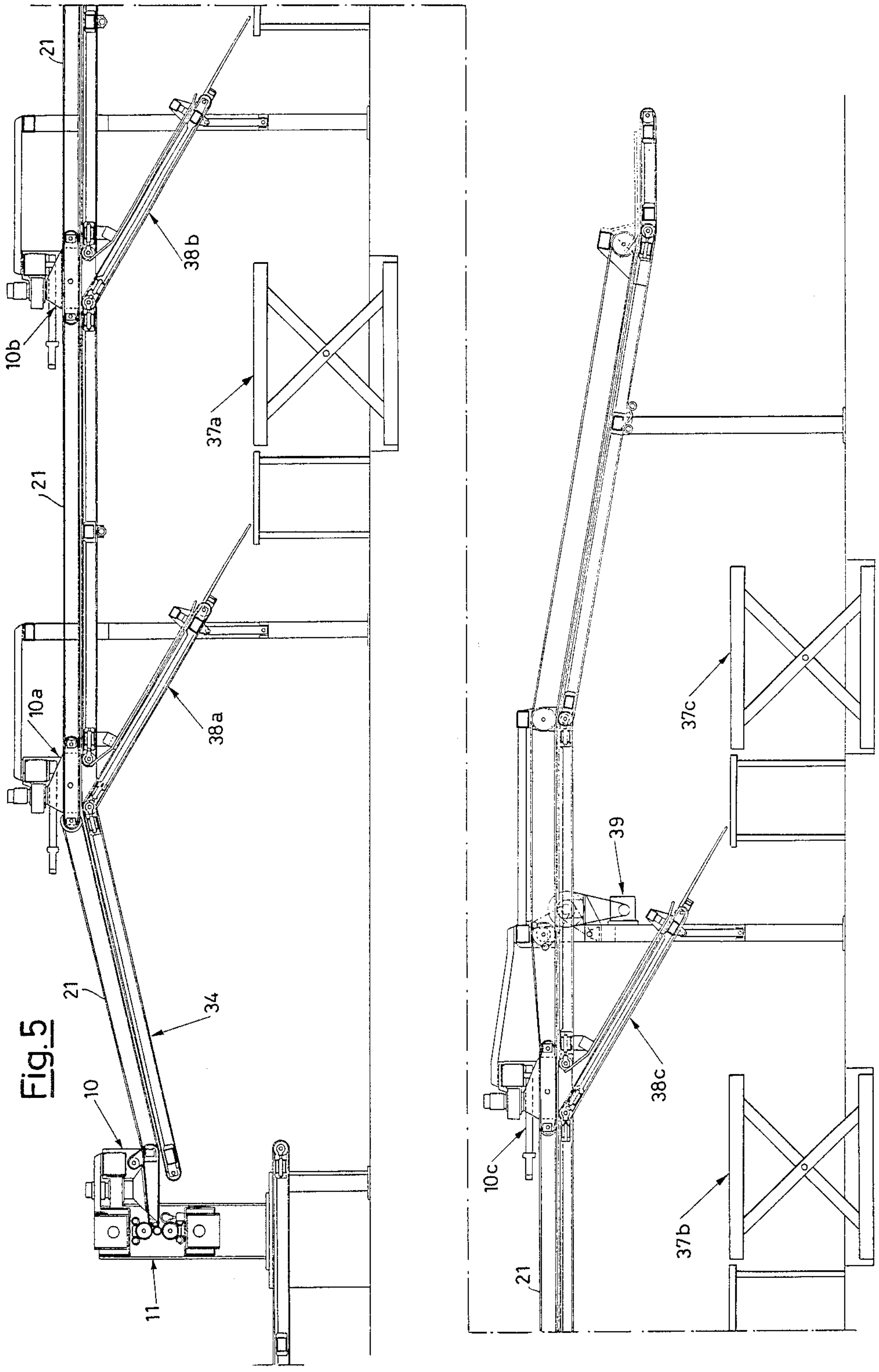
FIG. 5 illustrates a system comprising a plurality of the said aspirator devices disposed in cascade arrangement.

A system according to the invention can also comprise a plurality of further selectors **10*a*, 10*b* and 10*c* disposed in cascade arrangement downstream of the cutter 11, as shown in FIG. 5, with which respective stackers 37*a*, 37*b* and 37*c*** cooperate.

The coming into operation of the expeller nozzles 31 of the selector device **10*a*, 10*b* and 10*c* is controlled by the sensor 35 upstream of the cutter 11 so that the veneers can be selected on the basis of their dimensional characteristics and quality and sent to the stackers 37*a*, 37*b* and 37*c* through the intermediary of conveyors 38*a*, 38*b* and 38*c***.

During the path travelled by them along the system, the veneers are kept in contact with the conveyors **34, 34*a*, 34*b*, 34*c* and 34*d* by means of the lateral belts 21. The conveyor belts 15 of the first selector device 10 are controlled by the motor of the cutter, while those of the other selector devices 10*a*, 10*b* and 10*c* are controlled by an additional power unit 39** connected to them by transmission belts.

With a system comprising a plurality of selector devices the veneers can be selected into several groups on the basis of their dimensions and other characteristics, a typical selection being one composed of whole formats, whole sub-formats, whole-formats with face defects and veneers to be discarded.

I claim:

1. A system for selecting pieces of wood veneer on the basis of their dimensions, comprising, in combination, a cutter for cutting the wood veneer into pieces, at least a selector apparatus located downstream of the cutter and comprising a generally horizontally arranged vacuum conveyor having an upper run and a lower run, expeller means cooperating with said conveyor for separating selected pieces of the veneer from the conveyor, sensor means for measuring the length of pieces of veneer to be cut disposed upstream of the cutter and controlling the operation of said expeller means, and another conveyor for carrying pieces of veneer to a stacker downstream of said selector apparatus, wherein the improvement comprises that said vacuum conveyor has an inlet end and an outlet end, vacuum means located above and acting on said lower run for aspirating the veneer pieces against the lower run, said vacuum means having a varying vacuum action decreasing from the inlet end to the outlet end of said conveyor, said expeller means comprises a manifold located between the upper and lower runs of said vacuum conveyor adjacent the inlet end thereof, and a plurality of compressed air nozzles directed downwardly from said manifold toward the lower run of said vacuum conveyor for directing air jets against the pieces of veneer for selectively detaching pieces from said vacuum conveyor.

2. A system as described in claim 1, wherein said manifold extends transversely of the direction between the inlet and outlet ends, and said air nozzles are spaced apart on said manifold and are directed toward the inlet end of said vacuum conveyor, and said nozzles comprise a central said nozzle and two lateral said nozzles each located on an opposite side of said central nozzle.

3. A system as described in claim 1, wherein deflector rollers are located below and at the inlet end of said vacuum conveyor for directing pieces of veneer from the cutter toward said vacuum conveyor.

4. A system as described in claim 1, wherein said vacuum conveyor comprises a pair of endless belts laterally spaced apart, means for supporting said belts at the inlet and outlet ends so that said lower run is taut and said upper run is slack, and a supporting box-shaped structure located between said upper and lower runs and extending in the direction from the inlet end to the outlet end of said conveyor, means for maintaining a vacuum within said box-shaped structure, and a grille located between said belts and extending in the inlet end—outlet end direction and said grille having a series of aspiration holes therein with said holes extending in the inlet end—outlet end direction.

5. A system as described in claim 4, wherein said grille has sides extending in the inlet end—outlet end direction with said sides tapering inwardly toward one another in the direction from the inlet end toward the outlet end.

6. A system as described in claim 5, wherein said holes in said grille are elongated in the inlet end—outlet end direction and adjacent said holes are staggered in the inlet end—outlet end direction.

7. A system as described in claim 1, wherein a plurality of said selector apparatus are disposed in a cascade arrangement one following the other and a stacker device cooperating with each of said selector apparatus for stacking selected pieces of veneer displaced from said selector apparatus.

* * * * *